US011629661B1

(12) United States Patent
Pickett et al.

(10) Patent No.: US 11,629,661 B1
(45) Date of Patent: Apr. 18, 2023

(54) LOW SOOT STOICHIOMETRIC COMPRESSION-IGNITION COMBUSTION

(71) Applicant: National Technology & Engineering Solutions of Sandia, LLC, Albuquerque, NM (US)

(72) Inventors: Lyle M. Pickett, Livermore, CA (US); Julien Manin, Livermore, CA (US); Kevin Wan, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/498,967

(22) Filed: Oct. 12, 2021

(51) Int. Cl.
| F01N 3/10 | (2006.01) |
| F02D 41/02 | (2006.01) |
| F02D 41/00 | (2006.01) |
| F02D 41/14 | (2006.01) |

(52) U.S. Cl.
CPC ......... *F02D 41/1466* (2013.01); *F01N 3/101* (2013.01); *F02D 41/0055* (2013.01); *F02D 41/0275* (2013.01); *F02D 41/1454* (2013.01); *F01N 2570/10* (2013.01); *F01N 2570/14* (2013.01)

(58) Field of Classification Search
CPC .. F01N 3/101; F01N 2570/10; F01N 2570/14; F02D 41/1466; F02D 41/0275; F02D 41/1454; F02D 41/0055
See application file for complete search history.

(56) References Cited

U.S. PATENT DOCUMENTS

| 5,389,111 | A | * | 2/1995 | Nikanjam ................. C10L 1/08 585/14 |
| 5,875,743 | A | | 3/1999 | Dickey |
| 6,857,263 | B2 | | 2/2005 | Gray, Jr. et al. |
| 7,117,843 | B2 | | 10/2006 | Liu et al. |
| RE42,609 | E | | 8/2011 | Kurtz et al. |
| | | | (Continued) | |

OTHER PUBLICATIONS

Cha, et al., "Engine performance and exhaust emissions in stoichiometric combustion engines fuelled with dimethyl ether" In Proc. ImechE, vol. 226, Issue 5, May 2012, pp. 674-683.

*Primary Examiner* — Audrey B. Walter
*Assistant Examiner* — Dapinder Singh
(74) *Attorney, Agent, or Firm* — Calfee, Halter & Griswold LLP; Madelynne J. Farber; Samantha Updegraff

(57) ABSTRACT

A combustion system including a combustion mechanism that injects oxygenated fuel into a combustion chamber. The oxygenated fuel mixes with the intake air in the combustion chamber where the air-fuel ratio in a portion of the combustion chamber is stoichiometric. The combustion mechanism includes an ignition mechanism that ignites the air-fuel mixture that generates a threshold number of particulates during combustion of the air-fuel mixture. The combustion system further includes an exhaust gas recirculation (EGR) device that recirculates a portion of the exhaust gases back into the combustion chamber. The EGR device recirculates the portion of the exhaust to lower combustion temperature resulting in reduced amount of nitrogen oxide in the exhaust. The combustion system further includes a three-way catalytic converter in line with the exhaust channel to convert a second portion of the exhaust gases, leading to lower pollutant emissions than conventional combustion systems.

20 Claims, 4 Drawing Sheets

(56) References Cited

U.S. PATENT DOCUMENTS

| | | | | |
|---|---|---|---|---|
| 8,307,790 B2* | 11/2012 | Leone | ................... | F02B 43/12 |
| | | | | 123/3 |
| 2011/0132290 A1* | 6/2011 | Leone | ................ | F02D 41/0025 |
| | | | | 123/3 |
| 2017/0298850 A1* | 10/2017 | Kurtz | .................. | F02D 19/081 |

* cited by examiner

LOW SOOT STOICHIOMETRIC COMPRESSION-IGNITION COMBUSTION

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Most modern engines are direct-injection engines, such that each combustion cylinder of the engine includes a dedicated fuel injector configured to inject fuel directly into a combustion chamber. While direct injection engines represent an improvement in engine technology over past designs (e.g., port fuel injectors or carburetors) with regard to increased engine efficiency and reduced emissions, direct-injection engines can produce relatively high levels of certain undesired emissions.

Engine emissions can include particulate matter or soot, which results from combustion of a fuel-rich and oxygen-lean fuel mixture. Soot comprises small carbon particles produced in the fuel-rich regions of diffusion flames commonly created in a combustion chamber of an engine. Soot is an environmental hazard; an emission regulated by the Environmental Protection Agency (EPA) in the United States of America, and the second most important climate-forcing species (carbon dioxide being the most important). Currently, soot is removed from the exhaust of diesel engines by large and expensive particulate filters in the exhaust system. Other post-combustion treatments may also have to be utilized, such as $NO_x$ selective catalytic reduction, a $NO_x$ trap, oxidation catalyst, etc. These after-treatment systems require monitoring and periodic maintenance to enable continued and effective reduction of soot/particulates and other undesired emissions, and accordingly add further cost to an engine system both in terms of initial equipment cost and subsequent maintenance.

SUMMARY

The following is a brief summary of the subject matter that is described in greater detail herein. This summary is not intended to be limiting as to the scope of the claims.

In an exemplary embodiment, described herein is a combustion system that stoichiometrically mixes air and oxygenated fuel for relatively soot-free combustion. The combustion system includes an injector that injects the oxygenated fuel into the combustion chamber for mixing with intake air. The amount of oxygenated fuel injected into the combustion chamber is based on the amount of air therein to form the stoichiometric air-fuel mixture. As mentioned above, the use of oxygenated fuel reduces soot formation during combustion of the air-fuel mixture. The combustion system includes an ignition mechanism that ignites the air-fuel mixture. In an embodiment, the ignition mechanism comprises a piston that compresses the combustion chamber and the oxygenated fuel is selected for self-ignition (e.g., not requiring an independent spark) when the piston is compressed a threshold amount. The combustion system further includes an exhaust channel extending from the combustion chamber configured to direct exhaust from the ignition of the air-fuel mixture.

The combustion system further includes an exhaust gas recirculation (EGR) device that recirculates a portion of the exhaust gases back into the combustion chamber. Accordingly, the EGR device is in communication with the exhaust channel to capture the portion of the exhaust and direct the exhaust gases back into the combustion chamber via the intake valve(s). Recirculating the exhaust is used to lower the amount of oxygen gas in the combustion chamber as an effective way to reduce the production of $NO_x$. To further lower the $NO_x$ in the exhaust emission, the combustion system further includes a three-way catalytic converter that reduces $NO_x$ into $N_2$, and oxidizes hydrocarbon and CO into $CO_2$.

The above-described technologies present various advantages over conventional combustion systems. Conventional combustion systems generate soot during combustion of a fuel-rich and oxygen-lean fuel mixture which are then emitted into the environment and act as a pollutant. Conventional methods of removing the soot rely on using expensive filters prior to the exhaust stream leaving the combustion system. Another method involves using oxygenated fuel or rapid premixing with air to lower soot generation during combustion; however, methods to reduce soot typically result in higher flame temperatures and higher $NO_x$ formation. In contrast, the technologies described herein generate relatively soot-free combustion using a stoichiometric mix of air and oxygenated fuel and an EGR device to recirculate exhaust back into a combustion chamber, which limits or prevents to formation of soot while simultaneously lowering the $NO_x$ generated during combustion, avoiding the long-standing "soot/$NO_x$ trade-off" for diesel engines.

The above summary presents a simplified summary in order to provide a basic understanding of some aspects of the systems and/or methods discussed herein. This summary is not an extensive overview of the systems and/or methods discussed herein. It is not intended to identify key/critical elements or delineate the scope of such systems and/or methods. Its sole purpose is to present some concepts in a simplified form as a prelude to the more detailed description that is presented later.

DETAILED DESCRIPTION

Figure 1:
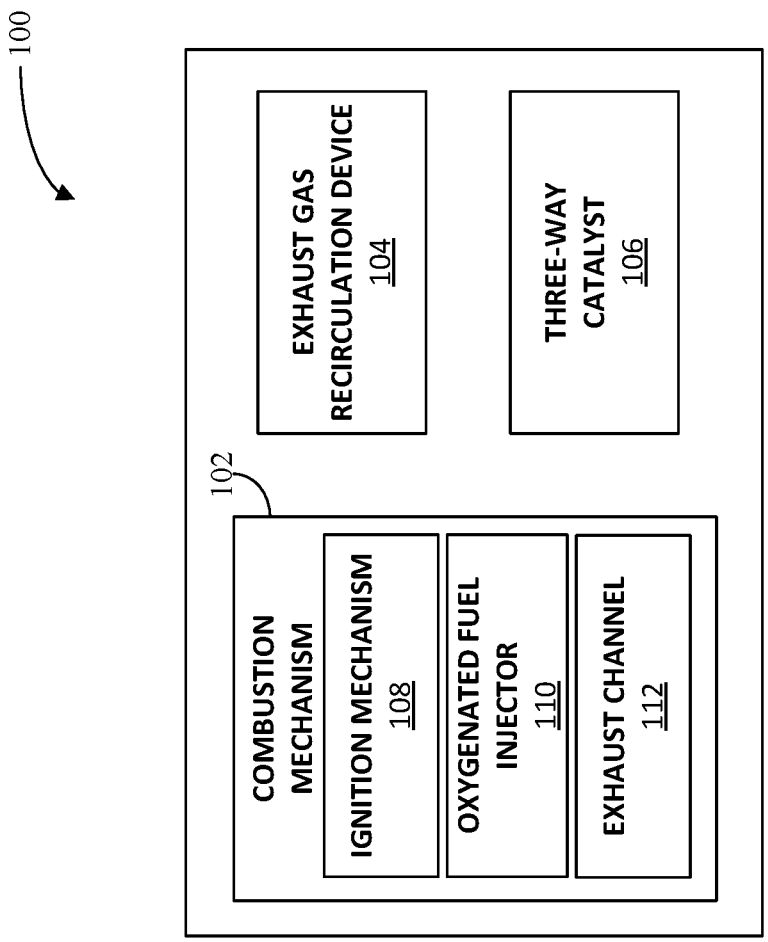
FIG. 1 illustrates a functional block diagram of a soot-free stoichiometric compress-ignition combustion system.

Various technologies pertaining to a system for relatively soot-free stoichiometric compression-ignition combustion are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is a combustion system that stoichiometrically mixes air and oxygenated fuel for relatively soot-free combustion. The combustion system injects the oxygenated fuel into the combustion chamber for mixing with intake air in the combustion chamber. The combustion system further includes an exhaust gas recirculation (EGR) device that recirculates a portion of the exhaust back into the combustion chamber to lower the amount of oxygen gas resulting in reduced $NO_x$ formation. To further lower the $NO_x$ in the exhaust emission, the combustion system further includes a three-way catalyst that uses chemical reactions to reduce $NO_x$ into $N_2$.

Turning to FIG. 1, illustrated is a functional block diagram of a vehicle combustion system 100 for relatively soot-free combustion of an air-fuel mixture that results in a lower level of particulates (e.g., soot) and/or $NO_x$ in the exhaust emissions as compared to conventional compression-ignition combustion systems. The combustion system 100 includes a combustion mechanism 102 configured to ignite the air-fuel mixture in a combustion chamber generating relatively soot-free exhaust. For instance, the combustion system 100 described herein can further lower the $NO_x$ level in the exhaust to a level below current emission standards for diesel engines in California, e.g., below 0.05 g/bhp. The combustion system 100 further includes an exhaust gas recirculation (EGR) device 104 that recirculates a portion of the exhaust from the combustion mechanism 102 into an air-intake supply of the combustion mechanism 102 to reduce gas oxygen concentration within a combustion chamber in the combustion mechanism 102, as will be described in detail below. The combustion system 100 yet further includes a three-way catalyst 106 for reducing emission levels in the exhaust from the combustion mechanism 102.

As can be seen in FIG. 1, the combustion mechanism 102 includes an ignition mechanism 108 configured to ignite the air-fuel mixture in the combustion chamber. In one embodiment, the ignition mechanism 108 comprises a compression ignition where the air-fuel mixture is compressed to the point that it auto-ignites without the need for a spark igniter. The ignition mechanism 108 selected may be based on the contents of the air-fuel mixture. For instance, a first ignition mechanism is used for a first air-fuel mixture, while a second ignition mechanism is used for a second air-fuel mixture. By way of an example, compression ignition can be used when the air-fuel mixture includes diesel fuel.

The combustion mechanism 102 can further include a fuel injector 110 that injects fuel into the combustion chamber. The fuel injector 110 can be configured to inject any suitable amount of fuel at any suitable rate to achieve and/or maintain a desired air-to-fuel ratio in the combustion chamber. For instance, the fuel injector 110 can be configured to achieve a stoichiometric air-fuel mixture in a portion of the combustion chamber. The portion can comprise the entire combustion chamber or a section thereof.

The combustion mechanism 102 can additionally include an exhaust channel 112 configured to direct exhaust generated from combustion of the air-fuel mixture. For instance, the exhaust channel 112 can be configured to direct the exhaust along a pathway away from the combustion chamber.

Figure 2:
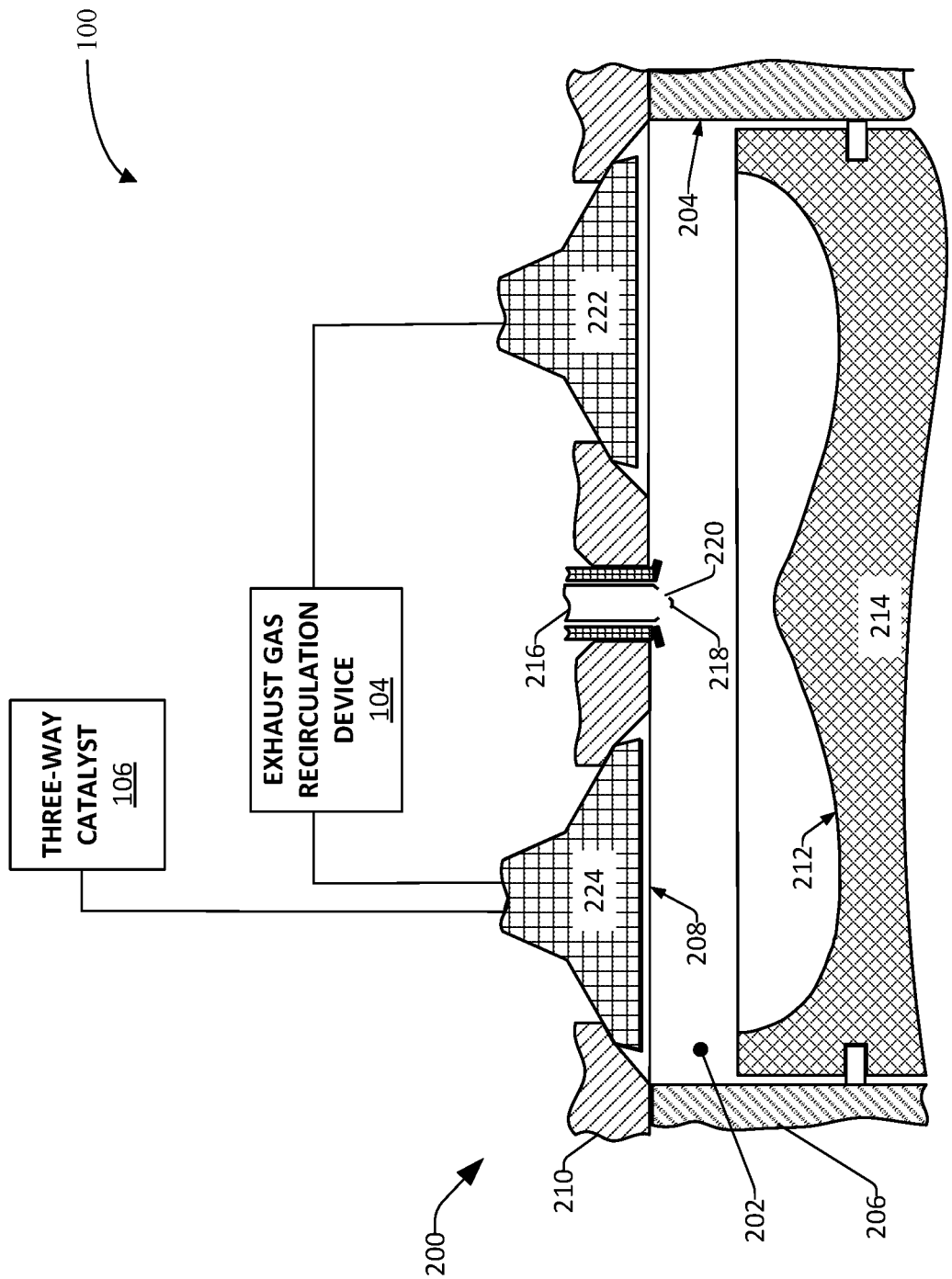
FIG. 2 illustrates an exemplary soot-free stoichiometric compress-ignition combustion system.

Turning now to FIG. 2, illustrated is an embodiment of the combustion system 100. The illustrated embodiment includes a combustion mechanism 200 that includes a combustion chamber 202. In the illustrated embodiment, the combustion chamber 202 has a generally cylindrical shape that is defined within a cylinder bore 204 formed (e.g., machined) within an engine block 206 of a vehicle engine (not show in its entirety). The illustrated combustion chamber 202 is defined at one end (a first end) by a flame deck surface 208 of a cylinder head 210, and at another end (a second end) by a piston surface 212 of a piston 214 that can reciprocate within the bore 204. A fuel injector 216 has an injector tip 218 that protrudes into the combustion chamber 202 through the flame deck surface 210 such that the injector 216 can directly inject fuel into the combustion chamber 202. The injector tip 218 can include one or more openings 220 (orifices) through which fuel is injected into the combustion chamber 202. Each opening 220 can have a particular cross-section (e.g., circular, elliptical, triangular, etc.). Moreover, the openings 220 can have similar cross-sectional areas and/or the cross-sectional area may vary.

Per conventional operation of a combustion engine, an intake valve(s) 222 is utilized to enable inlet of charge-gas into the combustion chamber 202. A charge-gas inside the combustion chamber 202 can comprise air with or without additional gas-phase compounds. As mentioned above, the fuel injected via the injector 216 mixes with the air in the combustion chamber to form the air-fuel mixture. Any suitable amount of fuel can be injected into the combustion chamber 202, and in the illustrated embodiments, the injected fuel forms a stoichiometric air-fuel mixture in a portion of the combustion chamber 202.

As mentioned above, the injector 216 can inject any suitable fuel into the combustion chamber 202. In one embodiment, the fuel can be selected based on a desired amount of particulates (e.g., soot) generated during combustion of the air-fuel mixture. For instance, the fuel can be selected to generate less than a threshold amount of soot. In one example, the fuel is selected to mix with the air in the combustion chamber in a way such that almost no soot forms within the combustion chamber 202 at any engine load or operating condition.

In another embodiment, the fuel comprises an oxygenated fuel with a threshold amount of oxygen per weight. In one example, the oxygenated fuel comprises 30% oxygen per weight. In another example, the oxygenated fuel comprises 50% oxygen per weight. In a further example, the oxygenated fuel comprises a poly-oximethyl-dimethyl-ether with a chain length of n. In yet another example, the oxygenated fuel comprises an oxymethylene dimethyl ether fuel. In a yet further example, the oxygenated fuel comprises a diethylene glycol ether fuel. In another example, the oxygenated fuel comprises OME with a chemical formula of CH3-O—(CH2-O)n-CH3.

The fuel can be further selected to have a threshold cetane number to auto-ignite during compression of the air-fuel mixture in the combustion chamber 202. For instance, the fuel can have ignition properties (using the fuel cetane number as a proxy for its ignition propensity) that causes self- or auto-ignition of the air-fuel mixture when the piston 214 compresses the mixture in the combustion chamber 202 to a certain level.

By selectively controlling the rate of injection of the fuel into the combustion chamber 202, the combustion mechanism 200 can regulate the rate at which the fuel mixes with the air inside the combustion chamber 202. This controlled mixing can be combined with fast ignition of the air-fuel mixture based on the ignition characteristics of the fuel and compression by the piston 214 to provide control and staging of heat-release rate(s) for relatively high efficiency within noise and pressure-rise rate limits.

The combustion mechanism 200 further includes one or multiple exhaust valve(s) 224 to enable exhausting of any combustion products (e.g., gases, soot, etc.) formed in the combustion chamber 202 during combustion of the air-fuel mixture. As previously mentioned, the combustion system 100 includes an EGR device 104 that recirculates a portion of the exhaust generated by the combustion mechanism 200 back into the combustion chamber 202. More particularly, the EGR device 104 can be configured to mix the recirculated exhaust with the charge gas entering the combustion chamber 202 via the intake valve(s) 222. As can be seen in FIG. 2, the EGR device 104 is in communication with both the exhaust valve(s) 224 to capture a portion of the exhaust and the intake valve(s) 222 to recirculate the exhaust back into the combustion chamber 202 and reduce gas oxygen concentration therein.

The EGR device 104 can recirculate any suitable amount of the exhaust gases back into the combustion chamber 202. For instance, the EGR device 104 may recirculate gases, as well as particulates, contained in the exhaust stream. In one example, the EGR device 104 recirculates nitrogen, carbon monoxide, and/or water vapor in the exhaust. The EGR device 104 can include one or more filters to filter out non-recirculated gases or particles in the exhaust. The EGR device 104 can recirculate all of a desired gas and/or particulate found in the exhaust and/or a portion thereof. For instance, the EGR device 104 can capture a portion of the exhaust as it travels in the exhaust channel 112.

As noted above, diluting the intake air with the EGR device 104 lowers flame temperatures, which contributes to reducing nitrogen oxide ($NO_x$) formation. However, recirculation of the exhaust gases may also result in an increase in exhaust particulate matter (e.g., soot) that have not been completely oxidized during the combustion mechanism 102. Accordingly, conventionally a trade-off between $NO_x$ formation and particulate emission occurs with recirculation.

The use of oxygenated fuels (described above) reduces or prevents the formation of soot, even with recirculation via the EGR device 104. Thus, the combustion system 100 using the oxygenated fuel in a stoichiometric air-fuel mixture in combination with the EGR device 104 can simultaneously achieve low soot and low nitrogen oxide emissions.

While stoichiometric mixtures with substantial exhaust gas recirculation may lower efficiency, the combustion system 100, described herein, can use a high compression ratio combined with fuel injection near full compression of the air-fuel mixture to promote high thermal efficiency. The use of a forced-mixing by compressing the charge gases combined with precisely-controlled fuel injection via the injector 216 can adequately mix all air and fuel to stoichiometric proportions for high combustion efficiency.

As mentioned above, the combustion system 100 further includes a three-way catalytic converter 106 for "three-way" conversion of the exhaust. More particularly, the three-way catalyst 106 converts one or more gas species in the exhaust to species considered less harmful to humans and/or the environment. In one embodiment, the three-way catalyst 106 converts the $NO_x$, unburned hydrocarbons, and/or carbon monoxide. More particularly, the three-way catalyst 106 can convert the $NO_x$ to nitrogen and oxygen, the unburned hydrocarbons to carbon dioxide and water, and/or the carbon monoxide to carbon dioxide.

The combined use of controlled stoichiometric mixing of air and oxygenated fuel, exhaust gas recirculation, and a three-way catalytic converter has the potential to reduce emission levels by at least tenfold when compared to conventional approaches. For instance, using exhaust gas to dilute the intake air down to 12% oxygen in the combustion chamber can lower $NO_x$ level in the exhaust to 0.228 g/kWh. The combustion system 100 described herein can further lower $NO_x$ levels in the exhaust by an order of magnitude compared.

Figure 3:
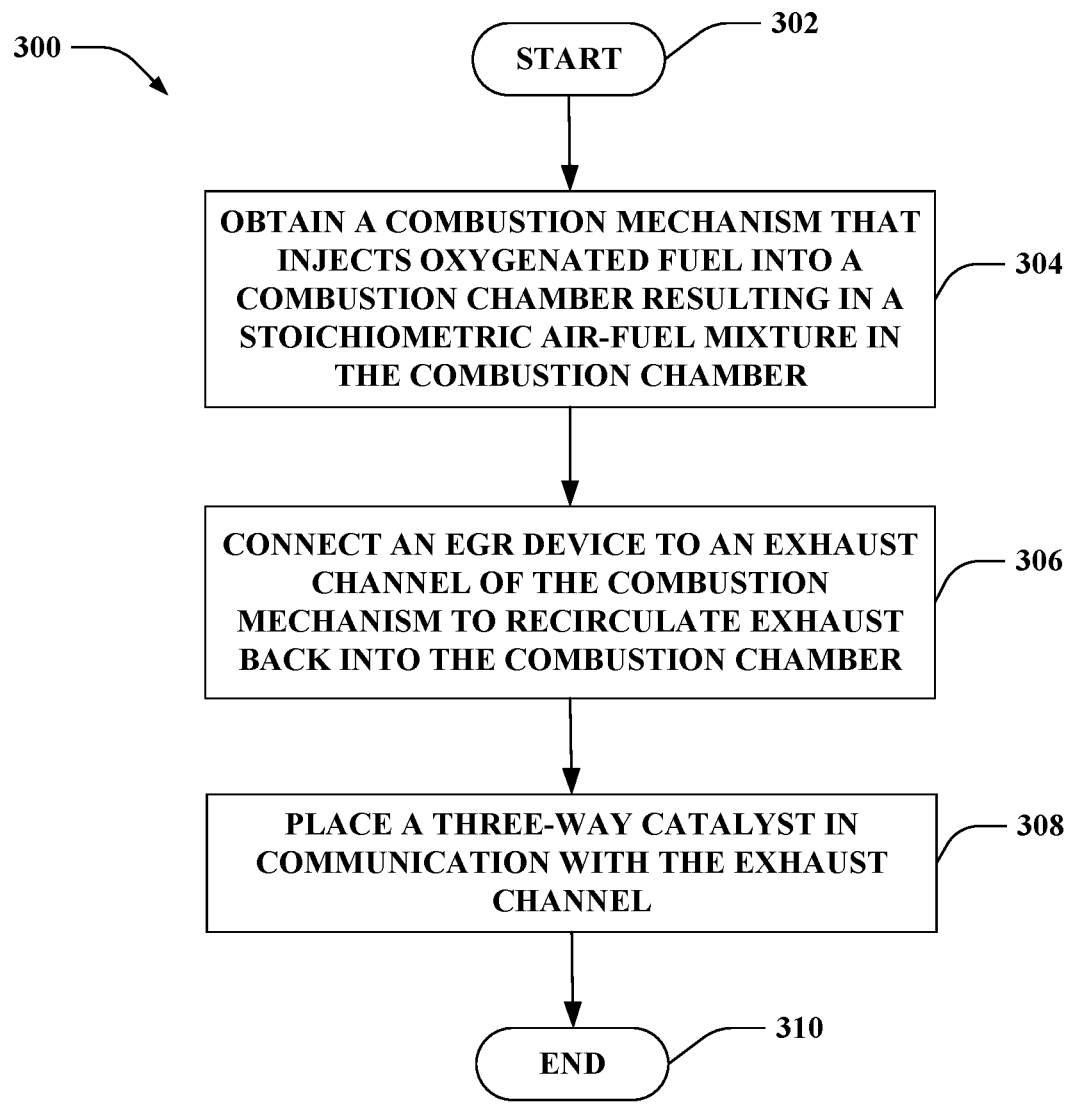
FIG. 3 is a flow diagram that illustrates an exemplary methodology for generating a combustion system.
Figure 4:
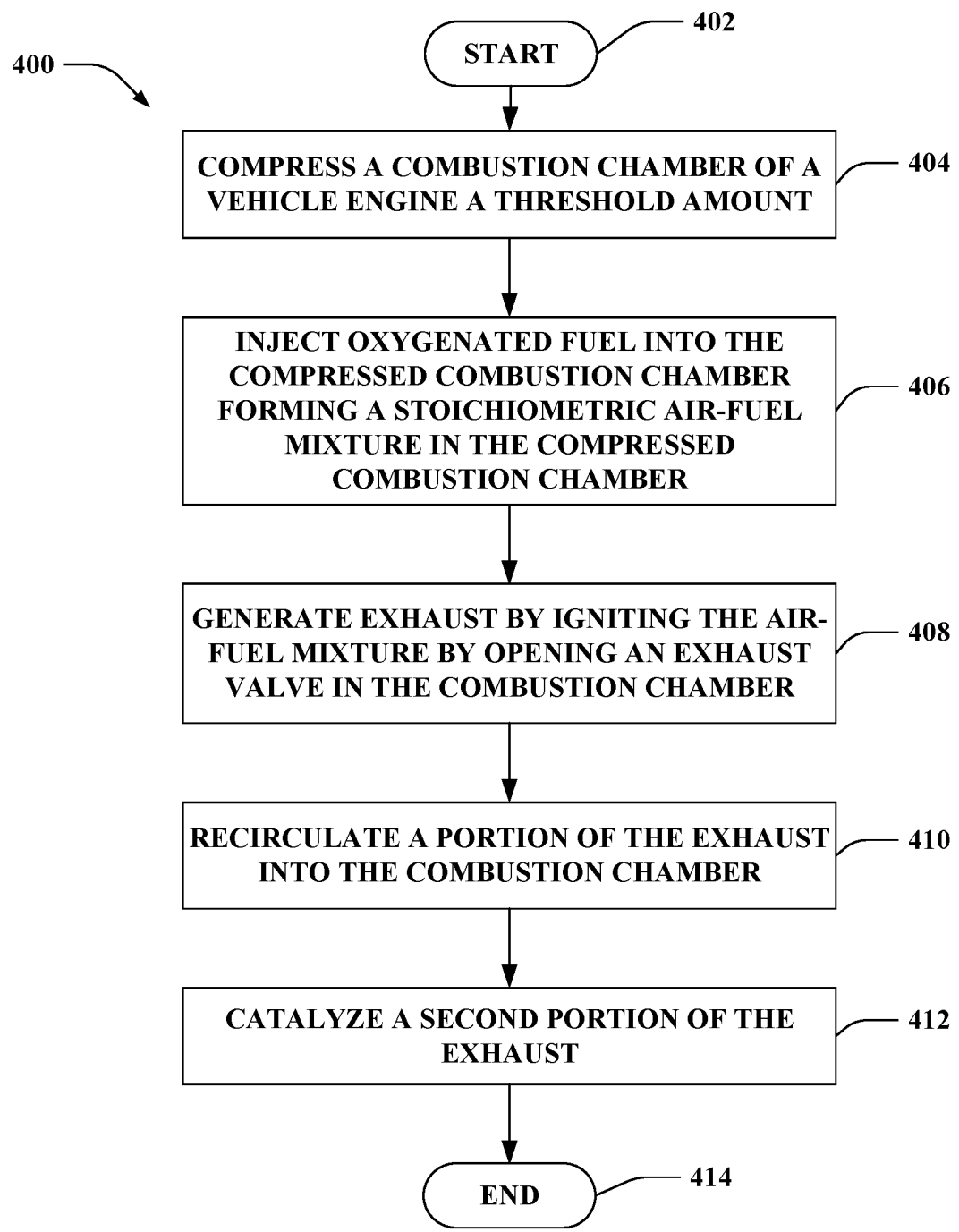
FIG. 4 is a flow diagram that illustrates an exemplary methodology for using a combustion system.

FIG. 3 illustrates an exemplary methodology of forming a relatively soot-free combustion system. FIG. 4 illustrates an exemplary methodology relating to using a soot-free combustion system. While the methodologies are shown as being a series of steps that are performed in a sequence, it is to be understood and appreciated that the methodologies are not limited by the order of the sequence. For example, some steps can occur in a different order than what is described herein. In addition, a step can occur concurrently with another step. Further, in some instances, not all steps may be required to implement a methodology described herein.

As illustrated in FIG. 3, a methodology 300 starts at 302, and at 304 a combustion mechanism that injects oxygenated fuel into a combustion chamber for mixing with air is obtained. An air-fuel ratio in a portion of the combustion chamber is stoichiometric. The combustion mechanism ignites the air-fuel mixture. The oxygenated fuel is selected to generate a threshold number of particulates during combustion of the air-fuel mixture. At 306 an EGR device is connected to an exhaust channel of the combustion mechanism. The exhaust channel can be configured to direct exhaust from the ignition of the air-fuel mixture. The EGR device can be configured to recirculate a portion of the exhaust from ignition of the air-fuel mixture back into the combustion chamber. At 308 a three-way catalyst is placed in line with the exhaust channel. The three-way catalyst can be configured to convert a second portion of the exhaust from a first chemical mixture to a second chemical mixture. The methodology 300 concludes at 310.

Turning now to FIG. 4, illustrated is a methodology 400 relating to using a relatively soot-free combustion system. The methodology 400 starts at 402, and at 404, the charge gas in a combustion chamber of an engine is compressed to a certain level. The compression level can be selected for quick ignition of an injected fuel. At 406, an oxygenated fuel is injected into the compressed combustion chamber. The amount of oxygenated fuel injected into the compressed combustion chamber forms a stoichiometric mixture with the air in the compressed combustion chamber. At 408, exhaust is generated by igniting and combusting the air-fuel mixture and opening one or several exhaust valve(s) of the combustion chamber. At 410, a portion of the exhaust is recirculated by an EGR device back into the combustion chamber to lower the amount of oxygen gas in the combustion chamber. At 412, a second portion of the exhaust is treated by a three-way catalytic converter. The methodology 400 concludes at 414.

(A1) In one aspect, some embodiments include a vehicle combustion system comprising a combustion mechanism. The combustion mechanism comprises an injector that injects oxygenated fuel into a combustion chamber. The oxygenated fuel mixes with intake air in the combustion chamber, where an air-fuel ratio in a portion of the combustion chamber is stoichiometric. The combustion mechanism further includes an ignition mechanism that ignites the air-fuel mixture. The oxygenated fuel can be selected to cause a threshold number of particulates to be generated during combustion of the air-fuel mixture. The combustion mechanism also includes an exhaust channel extending from the combustion chamber configured to direct exhaust from the combustion chamber caused by ignition of the air-fuel mixture. The combustion system also includes an exhaust gas recirculation (EGR) device in communication with the exhaust channel to recirculate a portion of the exhaust from ignition of the air-fuel mixture back into the combustion chamber. The EGR device recirculates the portion of the exhaust to lower an amount of nitrogen oxide in the exhaust. The combustion mechanism further includes a three-way catalytic converter in line with the exhaust channel to convert a second portion of the exhaust from a first chemical mixture to a second chemical mixture.

(A2) In some embodiments of the combustion system of (A1), the oxygenated fuel has at least a threshold oxygen weight percent.

(A3) In some embodiments of the combustion system of at least one of (A1)-(A2), the threshold comprises 30%.

(A4) In some embodiments of the combustion system of at least one of (A1)-(A2), the threshold comprises 50%.

(A5) In some embodiments of the combustion system of at least one of (A1)-(A4), the oxygenated fuel comprises an oxymethylene dimethyl ether fuel.

(A6) In some embodiments of the combustion system of at least one of (A1)-(A5), the oxygenated fuel comprises a diethylene glycol ether fuel.

(A7) In some embodiments of the combustion system of at least one of (A1)-(A6), the threshold number of particulates results in relatively soot-free combustion of the air-fuel mixture.

(A8) In some embodiments of the combustion system of at least one of (A1)-(A7), the second portion of the exhaust converted by the three-way catalytic converter comprises at least one of nitrogen oxide, unburned hydrocarbons, or carbon monoxide.

(A9) In some embodiments of the combustion system of at least one of (A1)-(A8), the oxygenated fuel is further selected to have ignition characteristics enabling auto-ignition of the air-fuel mixture.

(A10) In some embodiments of the combustion system of at least one of (A1)-(A9) the ignition mechanism comprises a compression process configured to compress the charge and cause ignition of the air-fuel mixture.

(B1) In another aspect, some embodiments include a method of forming a combustion system, where the method includes obtaining a combustion mechanism that injects oxygenated fuel into a combustion chamber for mixing with air in the combustion chamber. An air-fuel ratio in a portion of the combustion chamber is stoichiometric. The combustion mechanism ignites the air-fuel mixture and the oxygenated fuel is selected to generate a threshold number of particulates during combustion of the air-fuel mixture. The method also includes connecting an EGR device to an exhaust channel of the combustion mechanism. The exhaust channel is configured to direct exhaust from the ignition of the air-fuel mixture. The EGR device is configured to recirculate a portion of the exhaust from ignition of the air-fuel mixture back into the combustion chamber. The method further includes placing a three-way catalytic converter in line with the exhaust channel. The three-way catalytic converter is configured to convert a second portion of the exhaust from a first chemical mixture to a second chemical mixture.

(B2) In some embodiments of the method of (B1), the combustion mechanism ignites the air-fuel mixture by compressing the air-fuel mixture.

(B3) In some embodiments of at least one of the methods of (B1)-(B2), the oxygenated fuel has at least a threshold oxygen weight percent.

(B4) In some embodiments of at least one of the methods of (B1)-(B3), the oxygenated fuel comprises at least one of oxymethylene dimethyl ether fuel or diethylene glycol ether fuel.

(B5) In some embodiments of at least one of the methods of (B1)-(B4), the oxygenated fuel is further selected to have ignition characteristics enabling auto-ignition and combustion of the air-fuel mixture.

(C1) In another aspect, some embodiments comprise a relatively soot-free combustion system comprising a compression combustion mechanism. The compression combustion mechanism comprises an injector that injects oxygenated fuel into a compression combustion chamber. The oxygenated fuel mixes with intake air in the compression combustion chamber. The air-fuel ratio in a portion of the combustion chamber is stoichiometric. The oxygenated fuel is selected to auto-ignite the air-fuel mixture when the compression combustion chamber is compressed a threshold amount. The oxygenated fuel is further selected to generate soot-free exhaust. The compression combustion mechanism also includes an exhaust channel extending from the compression combustion chamber configured to direct the soot-free exhaust. The combustion system also includes an EGR device in communication with the exhaust channel to recirculate a portion of the exhaust from ignition of the air-fuel mixture back into the compression combustion chamber. The combustion system further includes a three-way catalyst in communication with the exhaust channel to convert a second portion of the exhaust from a first chemical mixture to a second chemical mixture.

(C2) In some embodiments of the combustion system of (C1), the oxygenated fuel has at least a threshold oxygen weight percent.

(C3) In some embodiments of the combustion system of at least one of (C1)-(C2), the threshold comprises 50%.

(C4) In some embodiments of the combustion system of at least one of (C1)-(C3), the oxygenated fuel comprises at least one of oxymethylene dimethyl ether fuel or diethylene glycol ether fuel.

(C5) In some embodiments of the combustion system of at least one of (C1)-(C4), the second portion of the exhaust converted by the three-way catalyst comprises at least one of nitrogen oxide, unburned hydrocarbons, or carbon monoxide.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicle combustion system comprising:
   a combustion mechanism configured to perform acts comprising:
      controlling a rate of injection of oxygenated fuel into a combustion chamber of the vehicle combustion system each time that a piston reciprocates in the combustion chamber to maintain a stoichiometric air-fuel mixture of oxygenated fuel in the combustion chamber, wherein the stoichiometric air-fuel mixture is maintained to mitigate soot emission from the vehicle combustion system;
      igniting the air-fuel mixture; and
      directing exhaust from the combustion chamber into an exhaust channel, where the exhaust is caused by combustion of the air-fuel mixture;
   an exhaust gas recirculation (EGR) device in communication with the exhaust channel, wherein the EGR device recirculates a portion of the exhaust from ignition of the air-fuel mixture back into the combustion chamber, wherein the EGR device recirculates the portion of the exhaust to lower an amount of nitrogen oxide in the exhaust; and
   a three-way catalytic converter in line with the exhaust channel, wherein the three-way catalytic converter converts a second portion of the exhaust from a first chemical mixture to a second chemical mixture.

2. The combustion system of claim 1, wherein the oxygenated fuel has an oxygen weight percent that is above a threshold.

3. The combustion system of claim 2, wherein the threshold is 30%.

4. The combustion system of claim 2, wherein the threshold is 50%.

5. The combustion system of claim 1, wherein the oxygenated fuel comprises an oxymethylene dimethyl ether fuel.

6. The combustion system of claim 1, wherein the oxygenated fuel comprises a diethylene glycol ether fuel.

7. The combustion system of claim 1, wherein the combustion of the air-fuel mixture is soot-free due to the air-fuel mixture being stoichiometric in the combustion chamber.

8. The combustion system of claim 1, wherein the second portion of the exhaust converted by the three-way catalytic converter comprises at least one of nitrogen oxide, unburned hydrocarbons, or carbon monoxide.

9. The combustion system of claim 1, wherein the air-fuel mixture is ignited upon the air-fuel mixture being compressed in the combustion chamber.

10. The vehicle combustion system of claim 1, wherein a diesel engine comprises the vehicle combustion system.

11. A method of operating a combustion system, the method comprising:
    controlling an amount of oxygenated fuel that is injected into a combustion chamber each time that a piston reciprocates in the combustion chamber to maintain a stoichiometric air-fuel mixture in the combustion chamber, where the stoichiometric air-fuel mixture is maintained to mitigate emission of soot from the combustion system;
    igniting the air-fuel mixture in the combustion chamber to cause combustion of the air-fuel mixture, wherein particulates are generated during combustion of the air-fuel mixture in the combustion chamber;
    directing exhaust from the combustion chamber caused by combustion of the air-fuel mixture to an EGR device by way of an exhaust channel;
    recirculating, by the EGR device, a portion of the exhaust caused by the combustion of the air-fuel mixture back into the combustion chamber; and
    converting, by a three-way catalytic converter that is in line with the exhaust channel, a second portion of the exhaust from a first chemical mixture to a second chemical mixture.

12. The method of claim 11, wherein igniting the air-fuel mixture comprises compressing the air-fuel mixture.

13. The method of claim 11, wherein the oxygenated fuel has an oxygen weight percent that is above a threshold.

14. The method of claim 11, wherein the oxygenated fuel comprises at least one of oxymethylene dimethyl ether fuel or diethylene glycol ether fuel.

15. A method for operating a combustion system, the method comprising:
    maintaining a stoichiometric air-fuel mixture in a compression chamber of the combustion system to mitigate emission of soot by the combustion system, where maintaining the stoichiometric air-fuel mixture comprises:
    repeatedly reciprocating a piston within the compression combustion chamber;
    for each reciprocation of the piston within the compression combustion chamber, injecting an amount of oxygenated fuel into the compression combustion chamber such that the air-fuel mixture formed within the compression combustion chamber is stoichiometric,
    compressing the air-fuel mixture in the compression combustion chamber to ignite the air-fuel mixture, wherein exhaust gas output from the compression combustion chamber is free of soot;
    directing the exhaust gas away from the combustion chamber by way of an exhaust channel;
    recirculating, by an EGR that is in communication with the exhaust channel, a first portion of the exhaust gas back into the compression combustion chamber; and
    converting a second portion of the exhaust gas from a first chemical mixture to a second chemical mixture by way of a three-way catalyst.

16. The method of claim 15, wherein the oxygenated fuel has an oxygen weight percent that is above a predefined threshold.

17. The method of claim 16, wherein the threshold is 50%.

18. The method of claim 16, where the threshold is 30%.

19. The method of claim 15, wherein the oxygenated fuel comprises at least one of oxymethylene dimethyl ether fuel or diethylene glycol ether fuel.

20. The method of claim 15, wherein the second portion of the exhaust gas converted by the three-way catalyst comprises at least one of nitrogen oxide, unburned hydrocarbons, or carbon monoxide.

* * * * *